United States Patent
Sattler et al.

(10) Patent No.: US 8,296,751 B2
(45) Date of Patent: Oct. 23, 2012

(54) SOFTWARE APPLICATION PROGRAM INTERFACE METHOD AND SYSTEM

(75) Inventors: Juergen Sattler, Wiesloch (DE); Joachim Gaffga, Wiesloch (DE)

(73) Assignee: SAP AG, Walldorf (DE)

( * ) Notice: Subject to any disclaimer, the term of this patent is extended or adjusted under 35 U.S.C. 154(b) by 2234 days.

(21) Appl. No.: 11/026,056

(22) Filed: Jan. 3, 2005

(65) Prior Publication Data

US 2006/0010452 A1    Jan. 12, 2006

Related U.S. Application Data

(60) Provisional application No. 60/586,279, filed on Jul. 9, 2004.

(51) Int. Cl.
*G06F 9/44* (2006.01)

(52) U.S. Cl. ........ 717/168; 717/169; 717/172; 717/178; 719/313; 719/328

(58) Field of Classification Search .......... 717/168–178; 719/313, 328, 330
See application file for complete search history.

(56) References Cited

U.S. PATENT DOCUMENTS

| | | | | |
|---|---|---|---|---|
| 5,491,800 A | * | 2/1996 | Goldsmith et al. | 709/221 |
| 5,659,767 A | * | 8/1997 | Nguyen et al. | 715/235 |
| 5,963,205 A | * | 10/1999 | Sotomayor | 715/531 |
| 6,052,779 A | * | 4/2000 | Jackson et al. | 713/2 |
| 6,405,225 B1 | * | 6/2002 | Apfel et al. | 715/526 |
| 6,405,366 B1 | * | 6/2002 | Lorenz et al. | 717/107 |
| 6,662,186 B1 | * | 12/2003 | Esquibel et al. | 707/101 |
| 7,036,072 B1 | | 4/2006 | Sulistio et al. | |
| 7,143,167 B2 | * | 11/2006 | Kampe et al. | 709/226 |
| 2001/0054046 A1 | | 12/2001 | Mikhailov et al. | |
| 2002/0188638 A1 | | 12/2002 | Hamscher et al. | |
| 2004/0010791 A1 | * | 1/2004 | Jain et al. | 719/318 |
| 2004/0010796 A1 | | 1/2004 | Paul et al. | |
| 2004/0017583 A1 | | 1/2004 | Kageyama et al. | |
| 2004/0193596 A1 | | 9/2004 | Defelice et al. | |
| 2004/0199922 A1 | * | 10/2004 | Krutsch et al. | 719/310 |
| 2005/0010458 A1 | | 1/2005 | Holloway et al. | |

(Continued)

FOREIGN PATENT DOCUMENTS

JP    2000039991 A   *   2/2000

OTHER PUBLICATIONS

Visualized and modeless programming environment for form manipulation languageMiyao, J.; Wakabayashi, S.; Yoshida, N.; Ohtahara, Y.Visual Languages, 1989., IEEE Workshop on Oct. 4-6, 1989 pp. 99-104.*

(Continued)

*Primary Examiner* — Wei Zhen
*Assistant Examiner* — Satish Rampuria
(74) *Attorney, Agent, or Firm* — Kenyon & Kenyon LLP

(57) ABSTRACT

A software application program interface system and method is provided. A call message may be received that specifies a type of application program to be called from a calling application program that is executing on a computer system. It may be determined whether the computer system has any application programs of the specified type available for execution. If an application program of the specified type is available for execution on the computer system, an application call message may be provided in a format recognized by a particular available application programs of the specified type, and the particular available application program may be called using the application call message.

18 Claims, 4 Drawing Sheets

U.S. PATENT DOCUMENTS

2005/0097462 A1    5/2005    Lumera et al.
2005/0160414 A1*   7/2005    Parnanen et al. ............. 717/148
2006/0004699 A1    1/2006    Lehikoinen et al.

OTHER PUBLICATIONS

Systematic design of static program analyzers, Jarzabek, S., Computer Software and Applications Conference, 1994. COMPSAC 94. Proceedings., Eighteenth Annual International, Nov. 9-11, 1994, IEEE, pp. 281-286.*

Static slicing of concurrent object-oriented programs, Jianjun Zhao; Jingde Cheng; Ushijima, K., Computer Software and Applications Conference, 1996, IEEE, Proceedings of 20th International, Aug. 21-23, 1996, pp. 312-320.*

A program dependence model for concurrent logic programs and its applications, Jianjun Zhao; Jingde Cheng; Ushijima, K.Software Maintenance, 2001. Proceedings. IEEE International Conference on, 2001, pp. 672-681.*

* cited by examiner

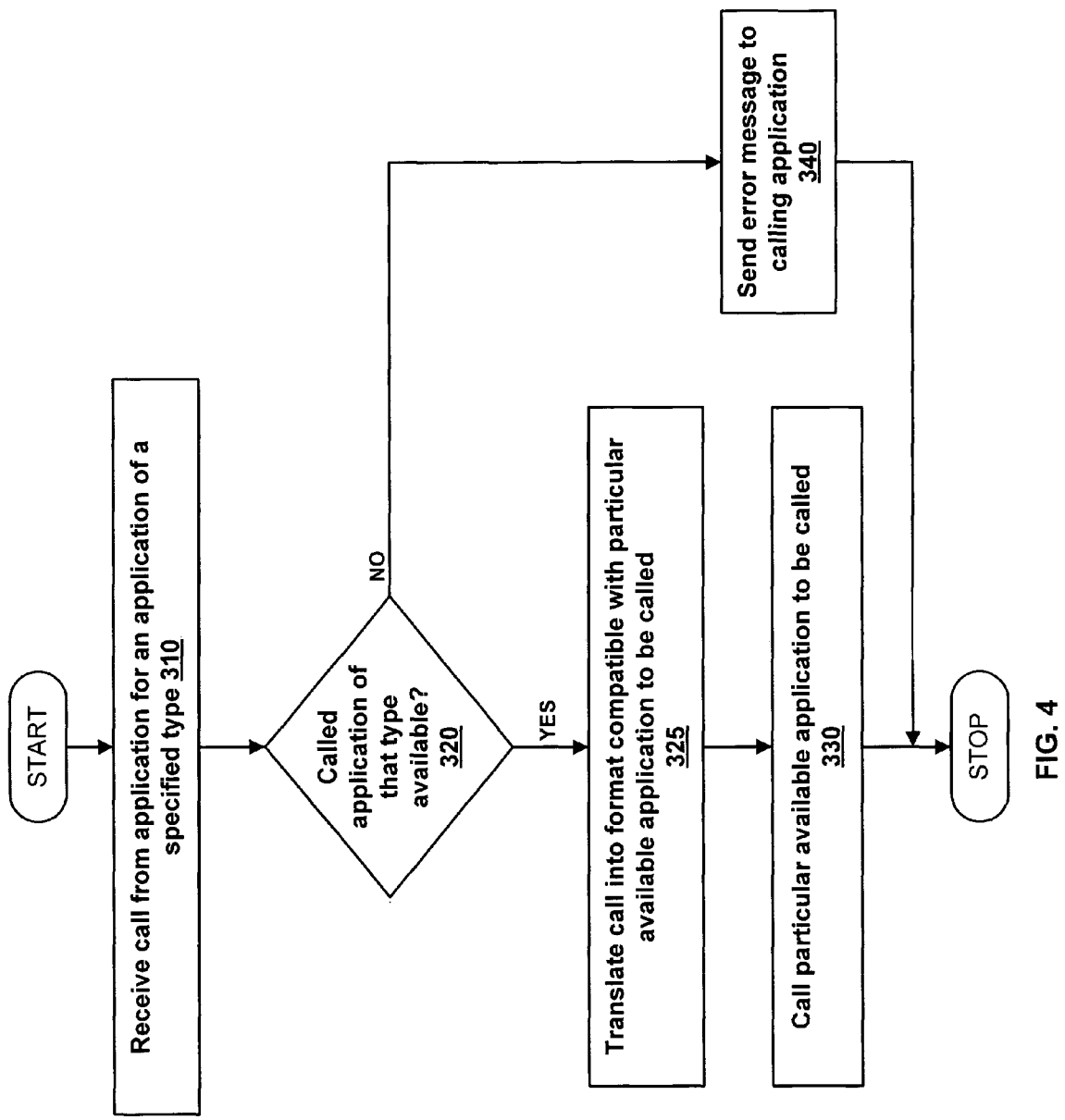

SOFTWARE APPLICATION PROGRAM INTERFACE METHOD AND SYSTEM

CROSS-REFERENCE TO RELATED APPLICATIONS

This application claims the benefit for purposes of priority to U.S. app. Ser. No. 60/586,279, filed Jul. 9, 2004.

BACKGROUND

Software application programs (herein, programs or applications) may call other application programs to perform a specific functionality. For example, the program Microsoft® Word may call a spreadsheet program to operate on a set of data in a table. When a first program calls a second program, the first program must comply with the application program interface (API) of the second program. As used herein, an API for a program specifies the format of calls to that program and parameters that may be passed to the program. Different application programs, and different versions of the same program, usually have different application program interfaces, even if the programs perform the same functionality. This is particularly true where the applications are from different third-party vendors. Differences in and changes to a program's API may cause conflicts and/or make software upgrades and additions time-consuming and costly because each affected calling application must be reconfigured. As an example, different applications that may be available to a user (e.g., SAP BW 2.0™ and MySAP ERP 1.0™) may be written to call different versions of the Microsoft Excel® spreadsheet (e.g., Excel 2003® and Excel 97®), in which case there may be a conflict between the usages of the Excel® spreadsheet.

To avoid these problems, there is a need in the art for a stable and consistent system having the ability to efficiently and cost-effectively upgrade existing software application programs and add new application programs.

BRIEF DESCRIPTION OF DRAWINGS

FIG. 4 is a flowchart of a method according to an embodiment of the present invention.

DETAILED DESCRIPTION OF EMBODIMENTS

The present invention provides a software application program interface system and method. In some embodiments, a first software application that is to call another type of application may forward the call to an integration module, and the integration module may call an application of that type (if available) after translating the call to a format recognized by the called application. It may be understood that the examples discussed below are for illustration purposes only and are not intended to limit the configuration to that shown.

Figure 1:
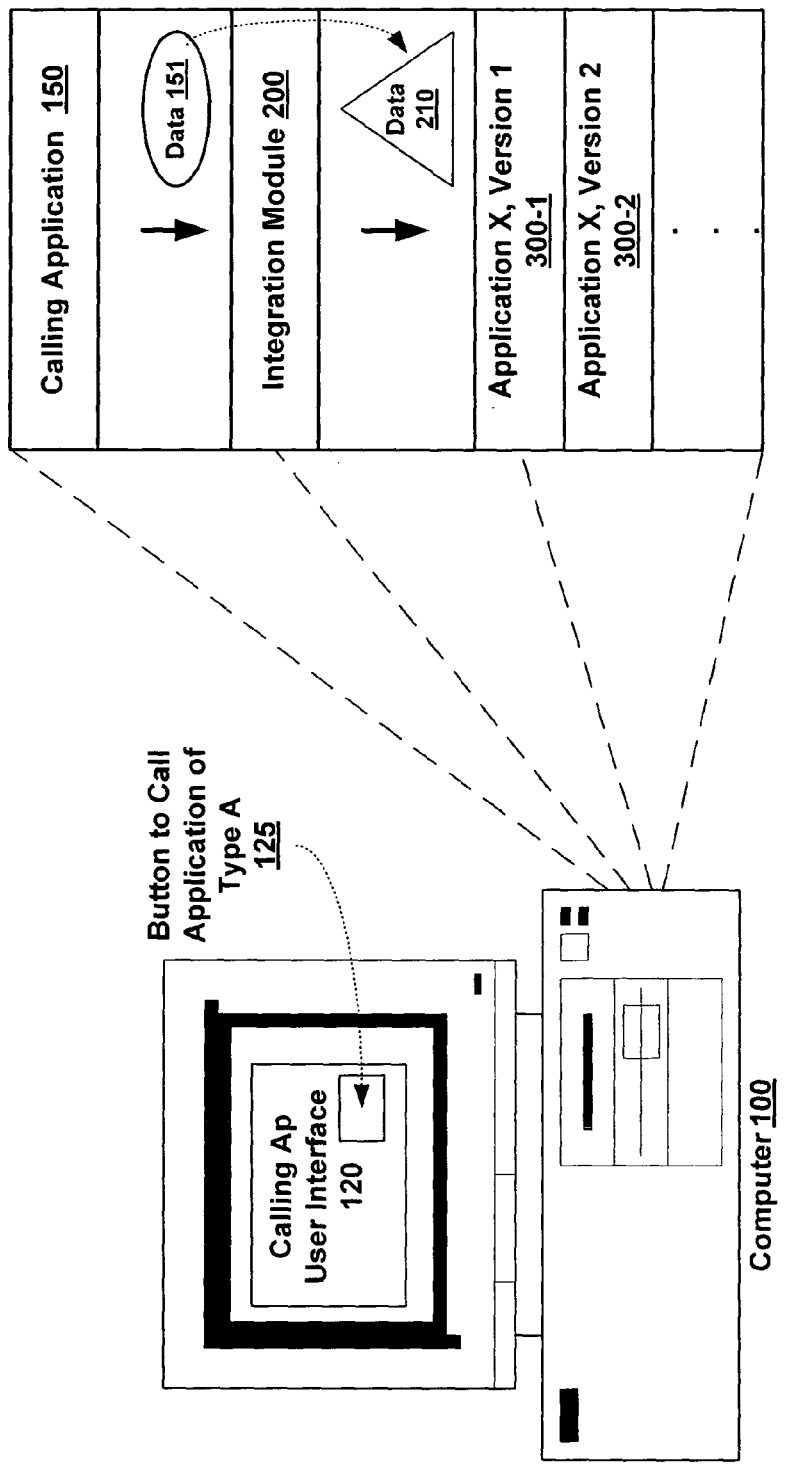
FIG. 1 is a simplified block diagram that shows an example of a computer executing an embodiment of the present invention.

FIG. 1 is a simplified block diagram that shows an example of a computer executing an embodiment of the present invention. Computer 100 includes memory 105, in which integration module 200, calling application 150, and several application programs 300 are stored. Integration module 150 may be any type of computer program, module or set of modules, routine or set of routines, etc. Computer 100 may be any type of device for running application software, such as, for example, a personal computer, a terminal, a personal digital assistant (PDA), etc. Memory 105 may be any type of machine readable medium (i.e., one capable of being read by a machine) such as a compact disk, hard drive memory, floppy disk memory, DVD-ROM, CD-ROM or any type of machine readable (computer readable) storing medium. Memory 105 may store data and/or sets of instructions that may be included within a computer program (which as is well known comprises a plurality of instructions) that is executable by a computer system.

Calling application 150 and application programs 300 may be any types of application programs, such as word processor programs, spreadsheet programs, calendar programs, database programs, finance programs, etc. As shown in FIG. 1, computer 100 includes a screen that displays a calling application user interface 120 (i.e., the user interface for calling application 150) which includes a button 125 that may be selected by the user to call an application of a particular type. For example, calling application 150 may be a personal finance type program (e.g., Quicken®) that may include a button to call a spreadsheet type program (e.g., to work on the personal finance data as a spreadsheet) or a word processor type program. Of course, other types of user interfaces may be employed. In other embodiments, the calling application may call an application on its own based on criteria other than a user instruction. As shown in FIG. 1, memory 105 also stores data 151, which may be data as formatted by calling application 150, and data 210, which may be data in a format that is recognized by one of the applications 300.

Integration module 200 may provide a method and system for integrating with applications 300 that allows a calling application to make calls that are independent of the data formats and APIs used by the application ultimately called. In some embodiments, integration module 200 may be used as an abstraction layer for integration with different applications 300. Upon receiving a call for an application type from a calling application, integration module 200 translates the call and any call parameters into those that are recognized by the called application of that type.

Data can be exported from the calling application via integration module 200 to applications 300.

It is to be understood that, in some embodiments, calling application 150, integration module 200 and application programs 300 may reside on the same or different computers in a network.

Figure 2:
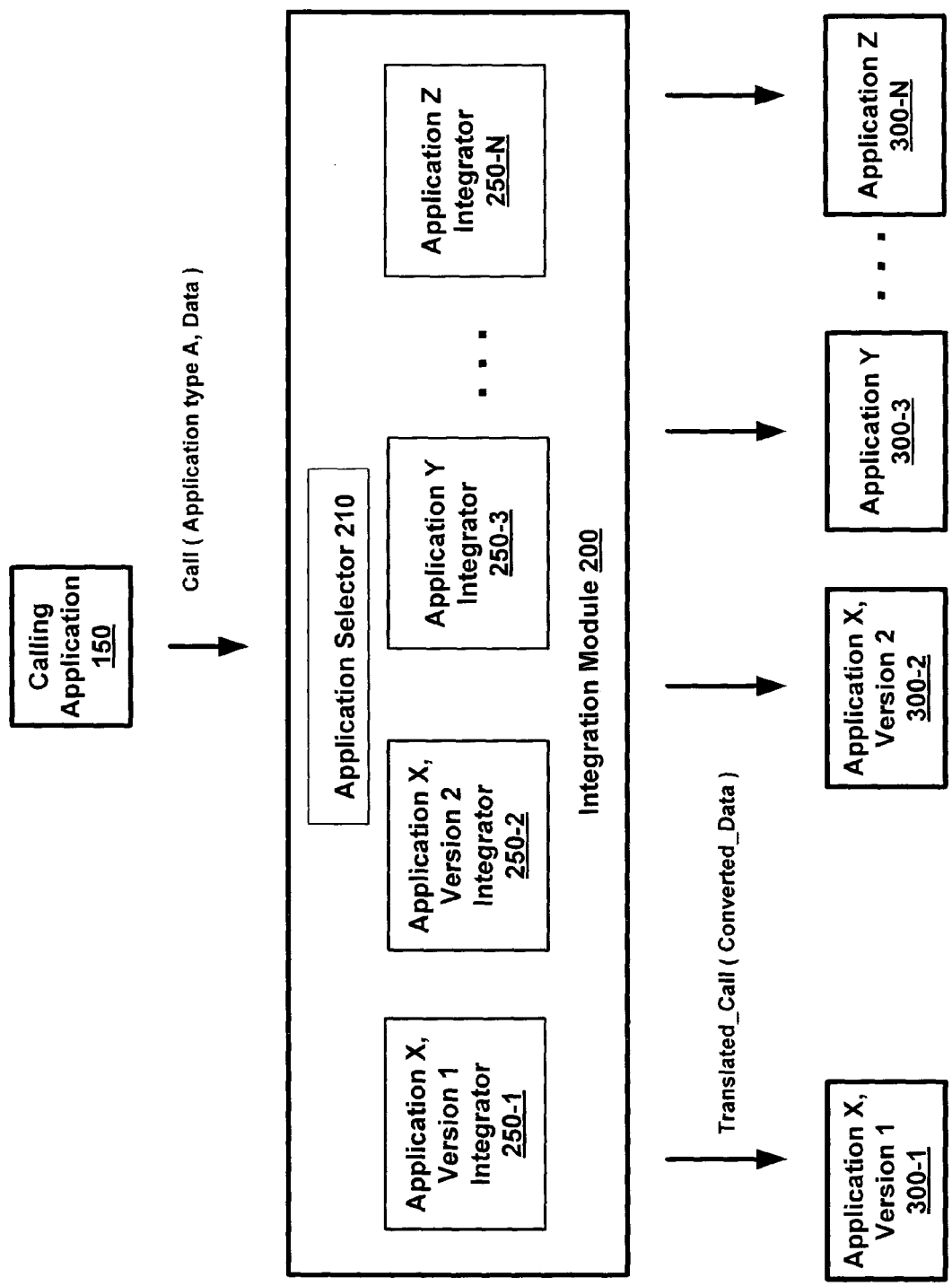
FIG. 2 is a simplified block diagram that shows an example of a software architecture to implement an embodiment of the present invention.

FIG. 2 is a simplified block diagram that shows an example of a software architecture to implement an embodiment of the present invention. This embodiment includes calling application 150, integration module 200, and called applications 300. Integration is made possible by integration module 200, which provides application integrators 250-1 through 250-N corresponding to respective applications 300-1 through 300-N. The application integrators include routines for integrating the particular formats of their respective applications' calls and call parameters with those of calling application 150, such that calling application 150 may call (invoke) applications 300-1 through 300-N and process data therein without modifications to either calling application 150 or called applications 300. Application integrators 250 may be plug-ins, dynamically generated routines, or static routines present at startup. Calling application 150 may send a call message (e.g., "Call(Application type A, Data)") that does not specify a particular application, but rather specifies a type of application to be called. In this example, application type A may be a word processor type application, a database type application, etc. Integrators 250 may then select a specific application to be called, and may then call APIs of the specific called application 300, with a message that has the specific application's format (e.g., "Translated_Call(Converted_Data)").

Figure 3:
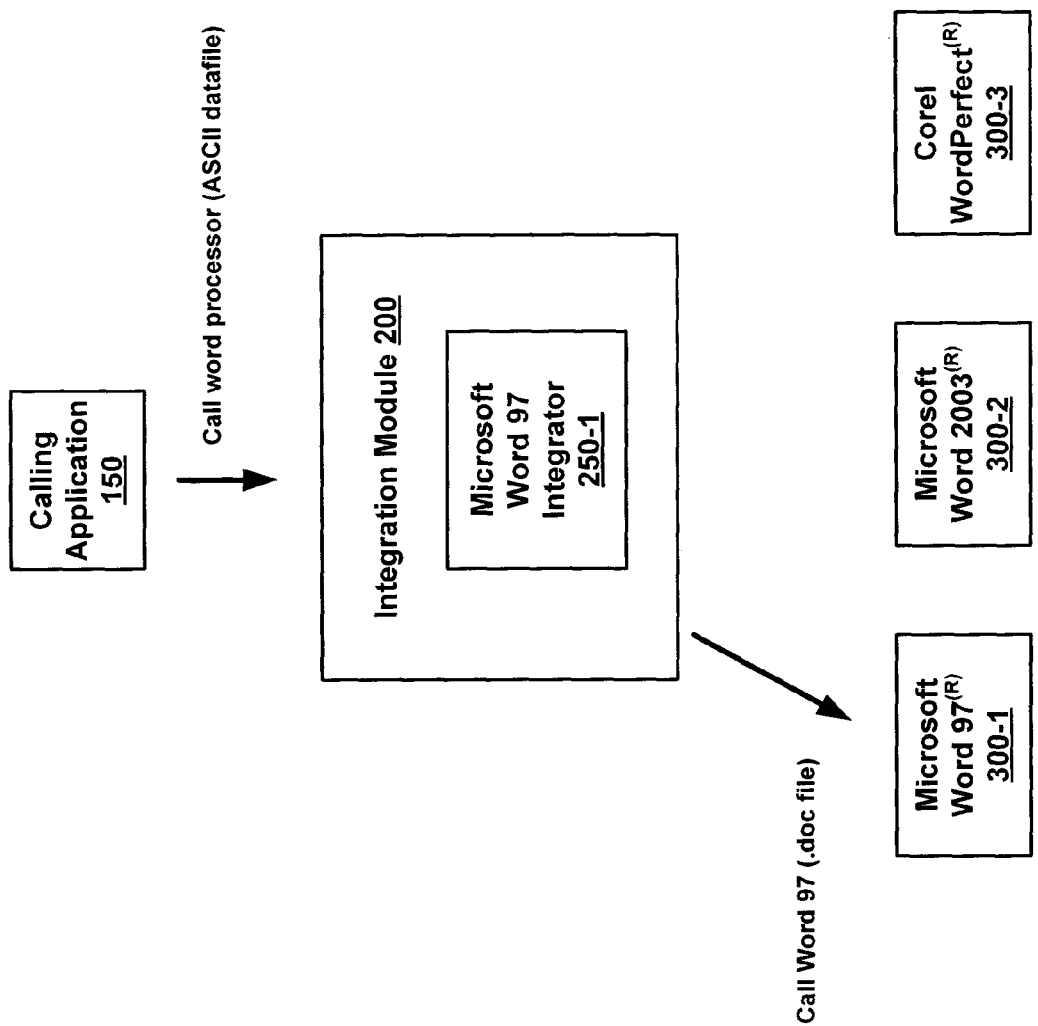
FIG. 3 is a simplified block diagram that shows an example of an implementation of an embodiment of the present invention.

FIG. 3 is a simplified block diagram that shows an example of an implementation of an embodiment of the present invention. Here, calling application 150 has data to be handled by a word processor application. In this example, application 300-1 is Microsoft® Word 97, application 300-2 is Microsoft® Word 2003, and application 300-3 is Corel® WordPerfect®. In an embodiment, calling application 150 sends a call message that is received by integration module 200. This message may request the invocation of a word processor type application, for example so as to process an ASCII datafile (e.g., data 151 in FIG. 1). An example of a format for such a call is "Call word processor (ASCII datafile) ." Integration module 200 receives the call message and determine whether any word processor application (here, applications 300-1, 300-2, or 300-3) is available to handle the call. Application selection module 210 in integration module 200 may determine that application 300-1 is available. One way to make this determination is to look in an application registry provided by the operating system, which indicates the available applications and their document types. Some examples of document types are .doc, .xls, etc. As such, integration module 200 may determine whether an application is available if an application's document type in the registry matches the document type requested by the calling application. Integration module 200 then either retrieves or generates an application integrator 250-1 that corresponds to application 300-1.

Integrator 250-1 provides an application specific call message in a format recognized by a particular available application programs of the specified type. For example, integrator 250-1 may translate the calling application's call and convert data into a .doc file that Microsoft® Word 97 recognizes. An example of the translated call is "Call Word 97 (.doc file)." Integrator 250-1 calls the API of Microsoft® Word 97 with the translated call and passes the converted data to application 300-1. Application 300-1 then processes the converted data.

In one embodiment, integration module 200 may use a routine in JavaScript™ from Sun Microsystems® to integrate the calling application with the called applications. In some embodiments integration module 200 may use a routine using Active X® technology from Microsoft Corp. to integrate the calling application with Microsoft Office® applications. Alternatively, in some embodiments, integration module 200 may use Java™ applet technology from Sun Microsystems® to integrate the calling application with Microsoft Open Office® applications.

It is to be understood that the set of available applications may include different versions of the same application. In this case, integration module 200 determines which version of the applications to handle the call from calling application 150. Typically, only one version is resident on a system because earlier versions are likely deleted when the system is upgraded to a newer version.

It is also to be understood that calling application 150 need not pass data to integration module 200 for processing by available application 300-1. Instead, calling application 150 may only make a call. As a result, application 300-1 on initiation may display a blank document or no data. The user may then input data to the blank document.

FIG. 4 is a flowchart of a method according to an embodiment of the present invention. In this method, a call message may be received from a calling application program executing on a computer system that specifies a type of application program to be called (310). For example, integration module may 200 receive a call from calling application 150 for a particular application type. Additionally, calling application 150 may export data as call parameters to be processed by the called application. In some embodiments, the data may be converted to the format of the called application by a back-end system that is in communication with the computer 100. An example of a conversion method is shown in co-pending application U.S. Ser. No. 11/026,052, filed with the present application, entitled METHOD AND SYSTEM FOR MANAGING DOCUMENTS FOR SOFTWARE APPLICATIONS. A determination may be made whether the computer system has any application programs of the specified type available for execution (320). In the example discussed above, integration module 200 may determine if a called application 300 of the specified type is available to handle the call. If not, integration module 200 sends an error message to calling application 150 (340).

If an application program of the specified type is available for execution on the computer system, an application specific call message may be provided in a format recognized by a particular available application program of the specified type (325). For example, integration module 200 may provide a call (convert call parameters) into a format compatible with the particular available application that is to be called. Integration module 200 may perform the conversion using resident conversion code. Alternatively, integration module 200 may call a separate routine having conversion code. The particular available application program may then be called using the application specific call message (330). For example, integration module 200 may call the API of the called application with the translated call and pass the converted call parameters to the application. The called application may then execute the specific called application and may process the call parameters' data.

When one of applications 300 is upgraded or a new application added, the developer may simply add a plug-in or otherwise modify integration module 200 to include respective upgraded or new integrators 250. The code for generating new or upgraded integrators may be provided by the vendors of the new or upgraded application software. The developer need not modify the applications themselves, thereby advantageously saving the developer time and costs. The computer system may be affected by the modifications, but the applications that use the integration module 200 may be unchanged.

The above is a detailed discussion of the certain embodiments. It may be understood that the examples discussed are for illustration purposes only and are not intended to limit the configuration to that shown. It is of course intended that the scope of the claims may cover other embodiments than those described above and their equivalents.

What is claimed is:
1. A method comprising:
receiving a call message specifying a type of application program to be called from a calling application program that is executing on a computer system;
determining whether the computer system has any application programs of the specified type available for execution;
if an application program of the specified type is available for execution on the computer system, performing the following:
identifying an application having a type that matches the type specified in the call message;

converting the call message directly to a format recognized by the identified application; and calling the identified application program using the converted application call message.

2. The method of claim 1, wherein said determining comprises using information in an application registry to determine whether an application of the specified type is available.

3. The method of claim 1, wherein said identifying comprises selecting one of a plurality of available application programs of the specified type as the particular available application program to be called.

4. The method of claim 2, wherein said identifying further comprises selecting one of a plurality of different versions of an application program as the particular available application program to be called.

5. The method of claim 1, wherein the specified type of application is one of a spreadsheet type application, a word processor type application, or a database type application.

6. The method of claim 1, further comprising:
receiving data along with the call message from the calling application;
converting the data to a format recognized by the identified application; and
forwarding the converted data to the identified application.

7. The method of claim 1, wherein the method further comprises sending an error message to the calling application if an application program of the specified type is not available.

8. A machine-readable medium storing a set of instructions, the set of instructions capable of being executed by a processor to implement a method comprising:
receiving a call message specifying a type of application program to be called from a calling application program that is executing on a computer system;
determining whether the computer system has any application programs of the specified type available for execution;
if an application program of the specified type is available for execution on the computer system, performing the following:
identifying an application having a type that matches the type specified in the call message;
converting the call message directly to a format recognized by the identified application; and
calling the identified application program using the converted application call message.

9. The machine-readable medium of claim 8, wherein said determining comprises using information in an application registry to determine whether an application of the specified type is available.

10. The machine-readable medium of claim 8, wherein said identifying comprises selecting one of a plurality of available application programs of the specified type as the particular available application program to be called.

11. The machine-readable medium of claim 9, wherein said identifying further comprises selecting one of a plurality of different versions of an application program as the particular available application program to be called.

12. The machine-readable medium of claim 8, further comprising:
receiving data along with the call message from the calling application;
converting the data to a format recognized by the identified application; and
forwarding the converted data to the identified application.

13. The machine-readable medium of claim 8, wherein the method further comprises sending an error message to the calling application if an application program of the specified type is not available.

14. A method comprising:
responsive to a call message entered via a first application executing on a computer system to launch a second application, the call message specifying a type of application program to be called;
searching an application registry that identifies available applications to determine if an application identified therein is of an application type that matches the application type identified in the call message;
when a match occurs,
identifying an application having a type that matches the type specified in the call message,
converting the call message directly to a format appropriate for the identified application, and,
launching the identified application using the converted application call message.

15. The method of claim 14, wherein the first application resides on a first computer in a network and the application registry resides on a second computer in the network.

16. The method of claim 14, wherein the first application resides on a first computer in a network and the identified application resides on a second computer in the network.

17. The method of claim 3, wherein said identifying comprises:
providing a list of available application programs of the specified type;
receiving a selection from the list of available application programs of the specified type; and
designating the selection as the identified application program.

18. The machine-readable medium of claim 10, wherein said identifying comprises:
providing a list of available application programs of the specified type; and
receiving a selection from the list of available application programs of the specified type; and
designating the selection as the identified application program.

* * * * *